United States Patent [19]

Rigsby

[11] Patent Number: 5,099,603
[45] Date of Patent: * Mar. 31, 1992

[54] PLANT GROWING RECEPTACLE

[76] Inventor: Robert Rigsby, 18671 Palm Creek Dr., Ft. Myers, Fla. 33917

[*] Notice: The portion of the term of this patent subsequent to Apr. 16, 2008 has been disclaimed.

[21] Appl. No.: 653,673

[22] Filed: Feb. 11, 1991

[51] Int. Cl.⁵ .................. A01G 9/02; A01G 27/00
[52] U.S. Cl. .................. 47/48.5; 47/79; 47/73
[58] Field of Search .................. 47/79, 48.5, 73

[56] References Cited

U.S. PATENT DOCUMENTS

| | | | |
|---|---|---|---|
| 216,808 | 6/1879 | Schrader | 47/79 |
| 3,800,471 | 4/1974 | Adams | 47/79 |
| 3,804,331 | 4/1974 | Levey | 47/78 |
| 4,142,324 | 3/1979 | Magyar, Jr. | 47/78 |
| 4,454,684 | 6/1984 | O'Hare | 47/48.5 |
| 4,604,825 | 8/1986 | Mainprice | 47/78 |
| 5,007,135 | 4/1991 | Rigsby | 47/73 |

FOREIGN PATENT DOCUMENTS 6216 of 1888 United Kingdom .................. 47/79

*Primary Examiner*—Richard E. Chilcot, Jr.
*Assistant Examiner*—Joanne C. Downs
*Attorney, Agent, or Firm*—Brady, O'Boyle & Gates

[57] ABSTRACT

A plant growing receptacle having an open top, a closed bottom wall and at least one opening provided in the receptacle side wall at a distance above the bottom wall. A mixture of soil and fertilizer is placed within the receptacle to promote further growth of the plant therein, and an irrigation system is provided for feeding water to the upper portion of the receptable and to the mixture of soil and fertilizer therein so that some of the water, soil and fertilizer gravitates to the bottom of the receptacle to form a slurry thus providing a moist environment within the receptacle. The opening in the receptacle side wall forming a combined root exit opening and a drain opening.

11 Claims, 3 Drawing Sheets

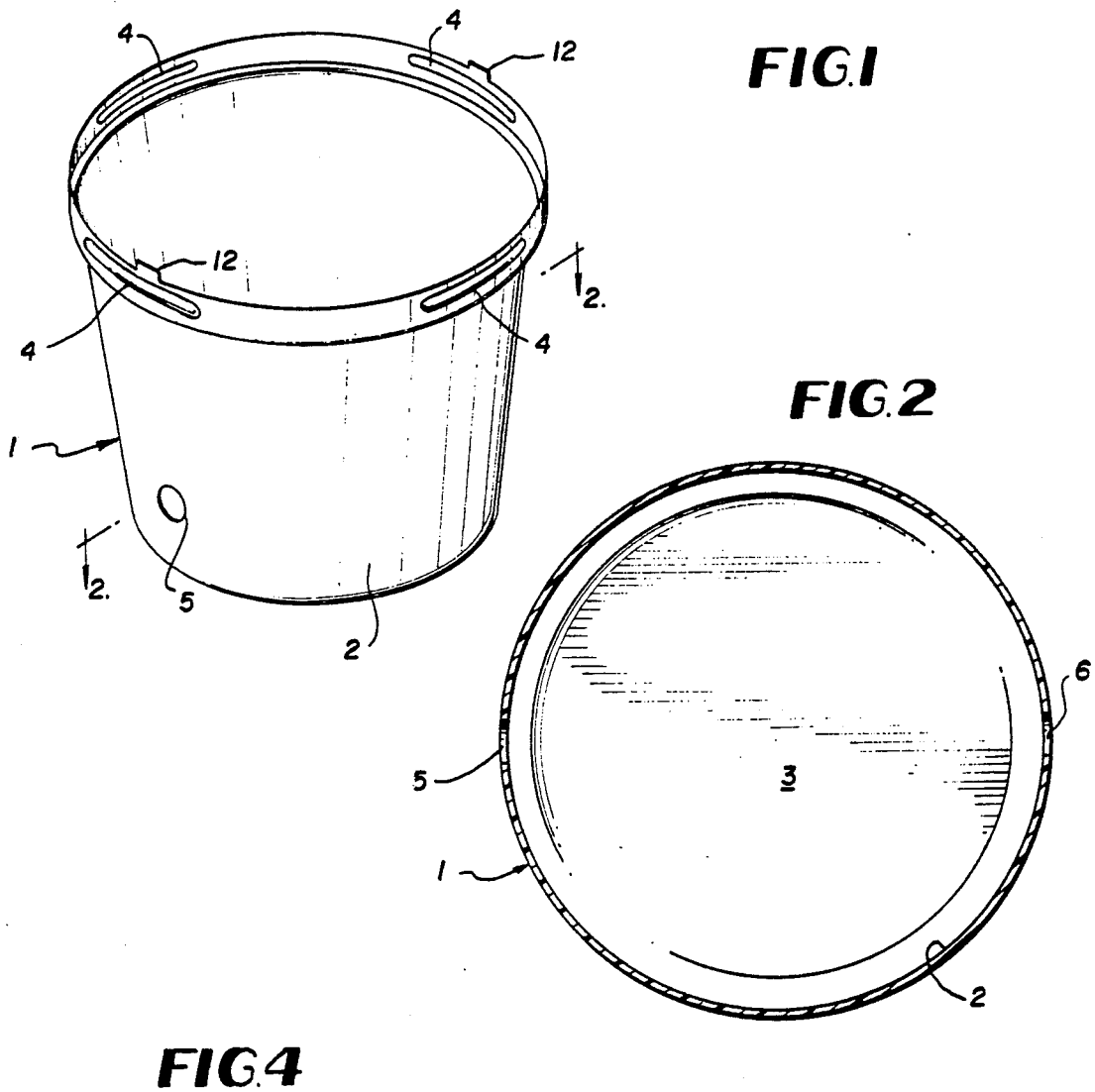
FIG.1
FIG.2
FIG.4
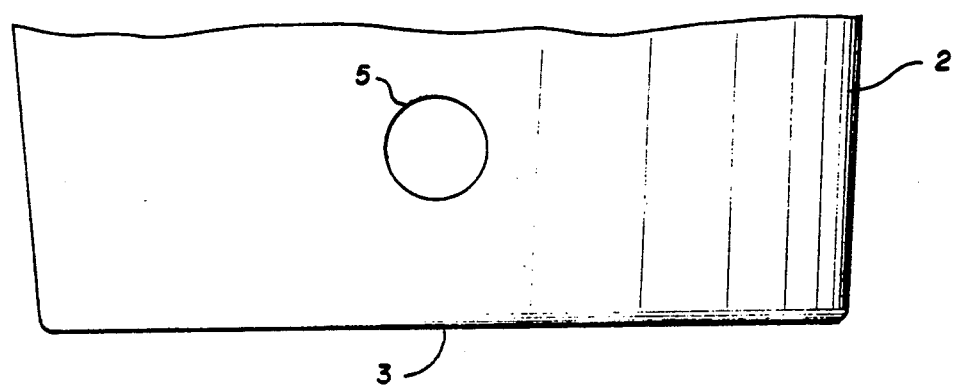

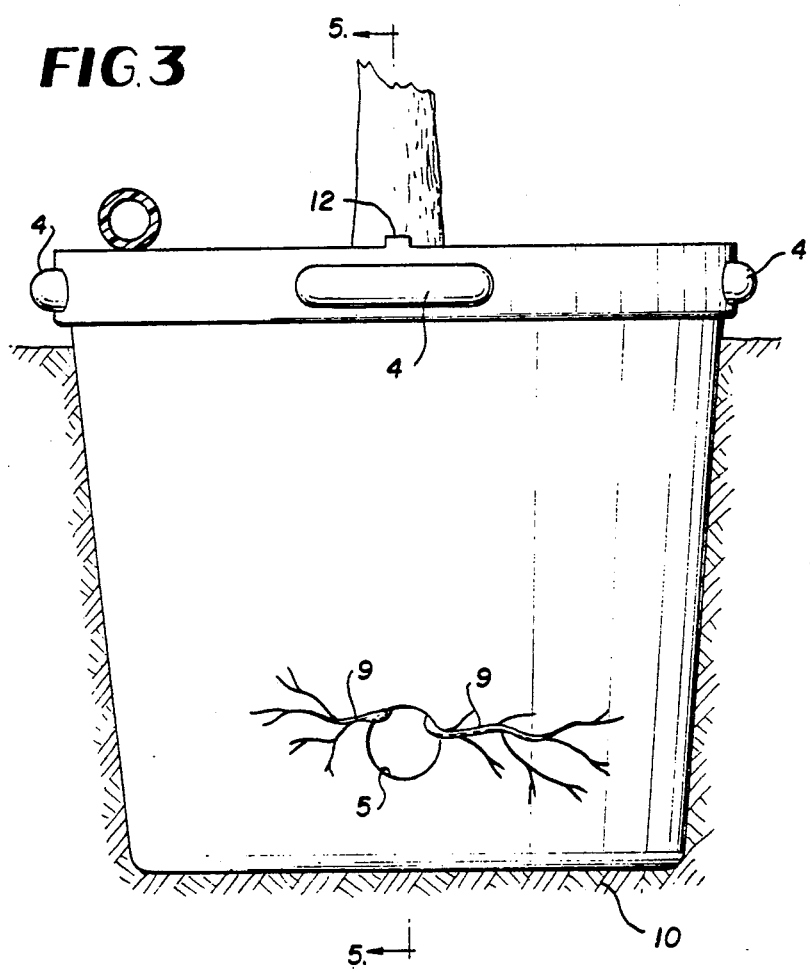
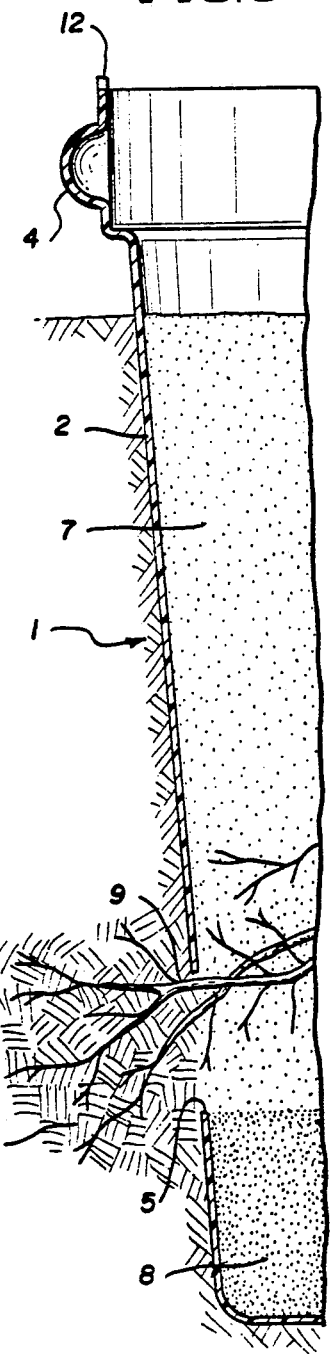
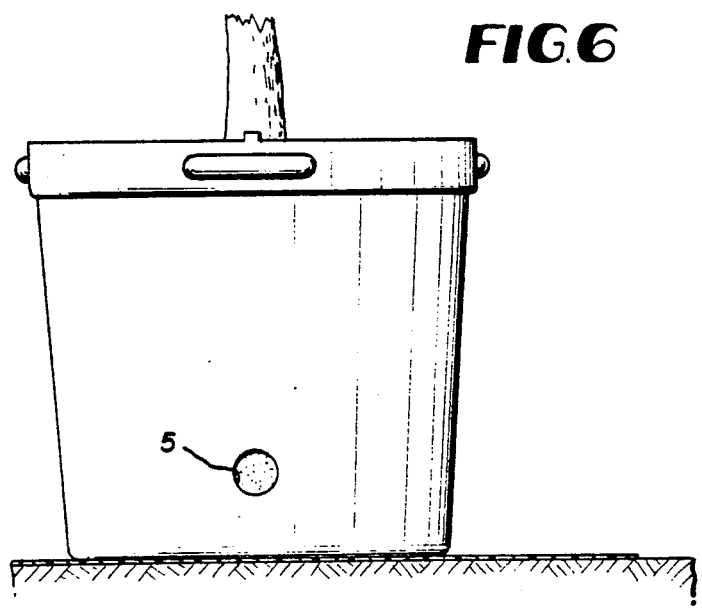

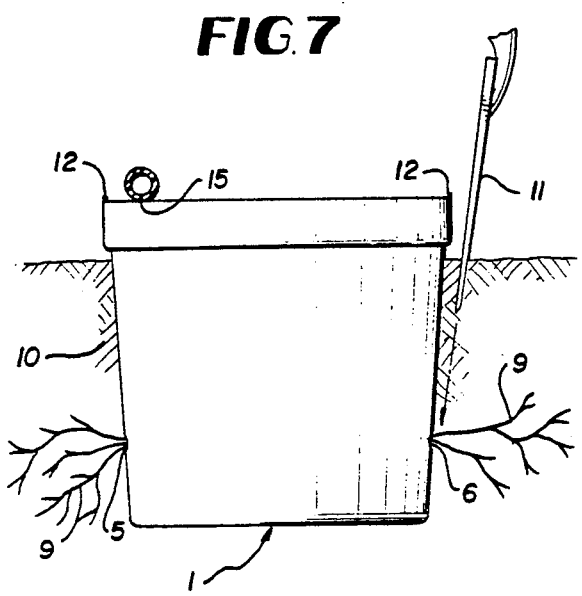
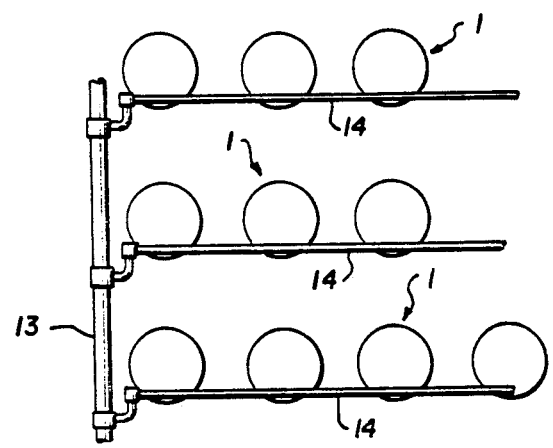
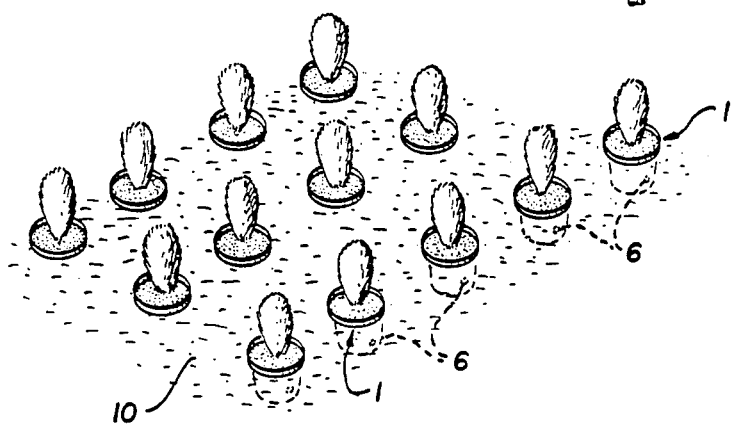
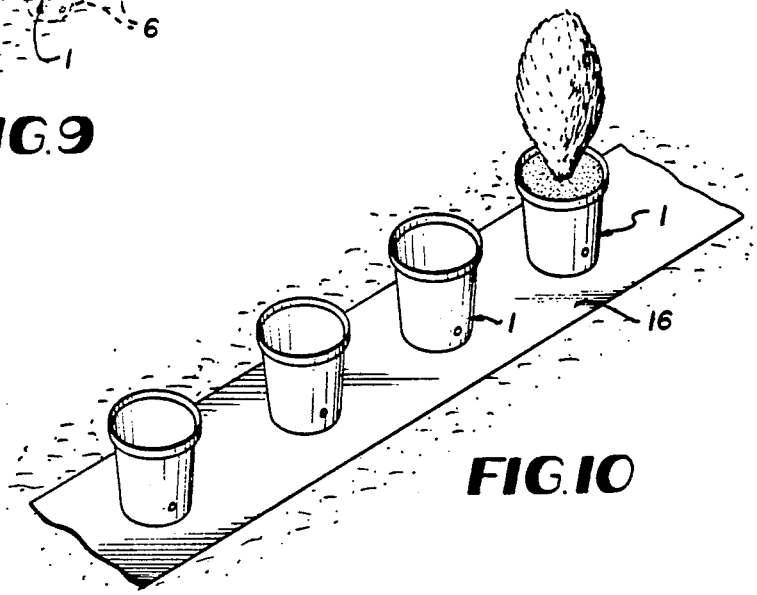

PLANT GROWING RECEPTACLE

CROSS-REFERENCE TO RELATED APPLICATION

This application is related to pending application Ser. No. 07/539,885, filed June 18, 1990, the disclosure of which is incorporated herein by reference.

BACKGROUND OF THE INVENTION

The plant growing receptacle disclosed in the above-identified application includes a receptacle having an open top and a side wall extending downwardly to a closed bottom. A root exit opening and drain openings are formed in the side wall above the closed bottom wall of the receptacle. By this construction and arrangement, a slurry of water, soil and fertilizer is formed in the receptacle intermediate the drain openings and bottom of the receptacle, to thereby provide a moist environment within the receptacle to promote further growth of a plant in the receptacle.

SUMMARY OF THE INVENTION

After further research and experimentation, it has been found that while the receptacle in the aforementioned patent application disclosed the use of separate root exit openings, and drain openings, the objects of the invention can also be obtained by providing the receptacle side wall with one or at least one opening which functions not only as a root exit opening but also as a drain opening.

BRIEF DESCRIPTION OF THE DRAWING

FIG. 1 is a perspective view of the plant growing receptacle of the present invention;

FIG. 2 is a view taken on lines 2—2 of FIG. 1;

FIG. 3 is a side elevational view of the plant growing receptacle in an in-soil planting position showing some of the roots extending outwardly from within the receptacle through the combined root exit and drain opening;

FIG. 4 is a fragmentary side elevational view of the plant growing receptacle showing the combined root exit and drain opening formed in the lower portion of the receptacle;

FIG. 5 is a view taken on lines 5—5 of FIG. 3;

FIG. 6 is a side elevational view of the plant growing receptacle shown in an above-ground position resting on an impervious liner placed thereunder;

FIG. 7 is a side elevational view of an in-ground plant growing receptacle showing the laterally extending roots as well as a tool for cutting or shearing off the roots extending from the sides of the receptacle;

FIG. 8 is a top plan view illustrating the watering or irrigation system for the plants in the receptacles;

FIG. 9 is a perspective view of the plant growing receptacles of the present invention shown in-ground planting rows and columns; and FIG. 10 is a perspective view of one row of plant growing receptacles of the present invention resting on an impervious liner thereunder.

DESCRIPTION OF THE PREFERRED EMBODIMENT

Referring to the drawings, and more particularly to FIGS. 1 and 2, the plant growing receptacle 1 of the present invention comprises, a container open at the top and having a side wall 2 tapering downwardly to a closed bottom wall 3. A conical shaped container is shown as it lends to easy nesting of the containers when not in use. To this end, the upper portion of the receptacle is formed with outwardly extending bulbous segments 4 which will limit the downward movement of the container so as to prevent the containers from sticking to one another when in the nested position. The receptacles are preferably formed of a suitable plastic material as this material is easily formed to the desired configuration by well known molding methods.

An opening 5 is provided in the side wall 2 and positioned at a distance above the closed bottom wall 3. The opening 5 provides the dual-fold function of not only allowing the drainage of water from within the container so as to prevent an over accumulation of water in the bottom of the receptacle which could cause root rot to the plant growing in the receptacle, but also it provides a root exit opening as shown in FIGS. 3 and 5.

While only one opening 5 is required, another opening 6 may be provided in the receptacle side wall, as shown in FIGS. 2 and 7.

As will be seen in FIG. 5, the growing medium 7 in the receptacle 1 may be a mixture of soil and fertilizer to enhance the growth of the plant in the receptacle. Watering of the plant in the receptacle will be described more fully hereinafter but suffice to say that the water fed into the receptacle will be in regulated amounts which will gravitate toward the bottom of the container and in so travelling will cause a small amount of soil and fertilizer within the receptacle to gravitate to the bottom of the receptacle and thus form a water-soil-fertilizer slurry 8 in the bottom portion of the receptacle. This water-soil-fertilizer slurry from which, by capillary action, the moisture therein rises upwardly into the growing medium 7 extending above the opening 5 to thus provide for a moist atmosphere which will provide the moisture necessary to promote continued growth of the plant within the receptacle.

Referring to FIGS. 3, 5 and 7, there is shown at 9 roots exiting through the openings 5 and 6 and into the surrounding soil 10 into which the receptacle 1 has been placed for further growth of the plant therein. With the roots extending into the soil 10 surrounding the receptacle 1, the receptacle is firmly anchored into the surrounding soil and the receptacle may not be easily removed from within the soil. When the plant has been sold to a customer, a workman at the nursery, using a sharp bladed instrument 11, in the nature of a hand shovel or the like, cuts off the roots, extending through the opening 5 and/or 6, and the receptacle containing the plant is given to the customer. When this has been accomplished, the plant, along with the entrapped roots in the receptacle and the soil therein, may be lifted from the receptacle, being now in condition to be replanted by the purchaser in a soil opening formed to receive the transplant.

Suitable indicia 12 should be placed on the upper edge of the receptacle so as to indicate to the workman at the nursery the location of the exit openings 5 and 6 formed in the lower portion of the receptacle when the same is employed in an in-soil placement.

One manner of irrigating or supplying water to the plants in the receptacle 1 is shown in part in FIG. 8, wherein a manifold pipe 13 located above ground communicates with feeder lines 14 extending therefrom and over the receptacles 1 positioned therebelow. Suitable exit openings 15 (FIG. 7) are provided in the feeder lines 14 for directing water into the receptacles 1. The amount of water exiting from the feeder lines 14 may be easily regulated by the operator of the nursery so as to prevent over watering of the plant which could result in root damage. The downward flow of irrigation water fed into the receptacle 1 will cause some of the soil within the receptacle to migrate toward the bottom of the receptacle to form the slurry of soil and fertilizer at the bottom of the container, as described hereinabove.

While the plant growing receptacle described thus far is employed for in-soil planting of the receptacle, as illustrated in FIG. 9, it can also be employed in an above-ground placement for the growth of plants therein, as shown in FIG. 10. In this arrangement, a plurality of plant receptacles 1 are placed on an impervious liner 16 comprising a sheet of plastic or like material and the water supply system is utilized for irrigation of the plant within the receptacles in the same manner as described above in connection with the in-soil planting of the receptacles. As previously described, the irrigation water fed into the receptacles will form a slurry or denser composition of fertilizer, soil and water at the bottom of the receptacle insuring a constant supply of moisture to the plant and also adding weight to the receptacle which will act as a ballast to prevent tipping of the receptacle with eventual loss of soil and fertilizer from within the receptacle due to high winds or accidental knocking over of the receptacle.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A plant growing receptacle having a plant positioned therein for further growth, said receptacle comprising an open top and a side wall extending downwardly to a closed bottom wall, at least one opening formed in said side wall at a distance above said bottom wall, said opening forming a combined root exit opening and drain opening, a wall portion extending between said opening and said closed bottom wall having no opening therein and with said bottom wall being capable of retaining water, a source of water for irrigating said plant in said receptacle, said source extending over the upper open end of said receptacle, a mixture of soil and fertilizer placed within said receptacle to promote further growth of the plant therein, said irrigating being regulated so as to allow feeding of water to the upper portion only of the receptacle and to the mixture of soil and fertilizer therein, said water gravitating toward the bottom of said receptacle and in its travel toward the bottom of the receptacle some of the water, soil and fertilizer gravitating toward the bottom of the receptacle to thereby form a slurry of water, soil and fertilizer thereon intermediate the side wall opening and the bottom of said receptacle, thus providing a moist and fertile environment within the receptacle.

2. A plant growing receptacle according to claim 1, wherein a plurality of openings are formed in the receptacle side wall.

3. A plant growing receptacle according to claim 1, wherein the receptacle is placed in the ground for continued growth of the plant, whereby the plant roots exit through said opening.

4. A plant growing receptacle according to claim 3, wherein indicia is placed on the upper edge of the receptacle in alignment with the opening, to thereby indicate the location of the root exit opening, whereby the cutting of the in-soil roots preparatory to removing the receptacle and associated plant from the soil is facilitated.

5. A plant growing receptacle according to claim 1, wherein said receptacle is in an above-ground placement for continued further growth of the plant contained therein.

6. A plant growing receptacle according to claim 1, wherein the water-soil-fertilizer slurry formed in the lower portion of the receptacle will add weight thereto and serve as a ballast for the receptacle, thereby avoiding tipping of the container.

7. A plant growing receptacle having a plant positioned therein for further growth, said receptacle consisting of an open top and a side wall extending downwardly to a bottom wall, at least one opening formed in said side wall, said opening forming a root exit opening in the side wall of said receptacle, and a slurry of water, soil and fertilizer in the bottom of said receptacle intermediate the side wall opening and the bottom of said receptacle to promote further growth of the plant therein, whereby during the growth of the plant the roots of the plant extend outwardly from the receptacle through the root exit opening.

8. A plant growing receptacle according to claim 7, wherein a plurality of root exit openings are formed in the receptacle side wall.

9. A plant growing receptacle according to claim 7, wherein the receptacle is placed in the ground for continued growth of the plant, whereby the plant roots exit through the opening and into the surrounding ground.

10. A plant growing receptacle according to claim 9, wherein indicia is placed on the upper edge of the receptacle in alignment with the opening, to thereby indicate the location of the root exit opening, whereby the cutting of the in-soil roots preparatory to removing the receptacle and associated plant from the soil is facilitated.

11. A plant growing receptacle according to claim 7, wherein the receptacle is in an above-ground placement for continued further growth of the plant contained therein.

* * * * *